(12) United States Patent
Zhang (10) Patent No.: US 10,761,662 B2
(45) Date of Patent: Sep. 1, 2020

(54) TOUCH PANEL, METHOD FOR MANUFACTURING TOUCH PANEL, AND TOUCH DISPLAY DEVICE

(71) Applicants: BOE TECHNOLOGY GROUP CO., LTD., Beijing (CN); HEFEI BOE DISPLAY LIGHTING CO., LTD., Anhui (CN)

(72) Inventor: Qiping Zhang, Beijing (CN)

(73) Assignees: BOE TECHNOLOGY GROUP CO., LTD., Beijing (CN); HEFEI BOE DISPLAY LIGHTING CO., LTD., Hefei, Anhui (CN)

( * ) Notice: Subject to any disclaimer, the term of this patent is extended or adjusted under 35 U.S.C. 154(b) by 57 days.

(21) Appl. No.: 16/131,280

(22) Filed: Sep. 14, 2018

(65) Prior Publication Data

US 2019/0235661 A1 Aug. 1, 2019

(30) Foreign Application Priority Data

Jan. 30, 2018 (CN) .......................... 2018 1 0092899

(51) Int. Cl.
*G06F 3/044* (2006.01)

(52) U.S. Cl.
CPC ............ *G06F 3/044* (2013.01); *G06F 3/0443* (2019.05); *G06F 3/0445* (2019.05); *G06F 3/0446* (2019.05); *G06F 2203/04103* (2013.01); *G06F 2203/04105* (2013.01)

(58) Field of Classification Search
CPC ........ G06F 3/0487–04897; G06F 2203/04105; G06F 3/016; G06F 3/0414
See application file for complete search history.

(56) References Cited

U.S. PATENT DOCUMENTS

| | | | |
|---|---|---|---|
| 2014/0152618 A1* | 6/2014 | Ando | G06F 3/044 345/174 |
| 2016/0357331 A1* | 12/2016 | Kano | G06F 3/044 |
| 2017/0097704 A1* | 4/2017 | Ando | B32B 27/308 |
| 2017/0115813 A1* | 4/2017 | Chen | G06F 3/0416 |

* cited by examiner

*Primary Examiner* — Sanghyuk Park
(74) *Attorney, Agent, or Firm* — Brooks Kushman P.C.

(57) ABSTRACT

A touch panel, a method for manufacturing the touch panel, and a touch display device are provided. The touch panel includes a first substrate, a second substrate arranged opposite to the first substrate, a touch layer and a plurality of pressure sensing structures. The touch layer is located between the first substrate and the second substrate. The plurality of pressure sensing structures and the touch layer are arranged in a same layer. Each of the plurality of pressure sensing structures includes a first pressure sensitive member and a second pressure sensitive member. A pressure sensitivity of the first pressure sensitive member is different from a pressure sensitivity of the second pressure sensitive member.

19 Claims, 7 Drawing Sheets

| arranging a plurality of pressure sensing structures and a touch layer at one side of a first substrate, where the plurality of pressure sensing structures and the touch layer are arranged in a same layer | 100 |

| arranging a second substrate at one side of the touch layer away from the first substrate | 200 |

TOUCH PANEL, METHOD FOR MANUFACTURING TOUCH PANEL, AND TOUCH DISPLAY DEVICE

CROSS-REFERENCE TO RELATED APPLICATION

This application claims priority to Chinese Patent Application No. 201810092899.2 filed on Jan. 30, 2018, which is incorporated herein by reference in its entirety.

TECHNICAL FIELD

Embodiments of the present disclosure relate to the field of touch technologies, and for example, to a touch panel, a method for manufacturing the touch panel, and a touch display device.

BACKGROUND

With rapid developments of display technologies, a touch screen panel (also called "touch panel") has been increasingly popular in people's daily lives. In a related art, according to its structure, the touch screen panel is divided into an add on mode type, an on cell type, an in cell type, and the like. For the add on mode type touch screen panel, a touch module and a display module are manufactured separately, and then attached together, to form the touch screen panel with a touch function. The touch module is mounted on the display module and configured to detect a position touched by a user.

As an important tool for human-computer interactions, the touch screen panel in the related art is only used for detecting the user touch position, so it has a relatively small application range.

SUMMARY

A touch panel includes a first substrate, a second substrate arranged opposite to the first substrate, a touch layer, and a plurality of pressure sensing structures. The touch layer is located between the first substrate and the second substrate. The plurality of pressure sensing structures and the touch layer are arranged in a same layer. Each of the plurality of pressure sensing structures includes a first pressure sensitive member and a second pressure sensitive member. A pressure sensitivity of the first pressure sensitive member is different from a pressure sensitivity of the second pressure sensitive member.

In some embodiments, the touch panel further includes a spacer. The spacer is configured to separate the first pressure sensitive member of the each of the plurality of pressure sensing structures from the second pressure sensitive member of the each of the plurality of pressure sensing structures.

In some embodiments, the first pressure sensitive member is located between a first side of the spacer and the touch layer; and the second pressure sensitive member is located between a second side of the spacer and the touch layer.

In some embodiments, the touch layer includes a first touch layer and a second touch layer; the first touch layer is located at one side of the first substrate close to the second substrate; the second touch layer is located at one side of the second substrate close to the first substrate; and an orthographic projection of the each of the plurality of pressure sensing structures on the first substrate is located in an overlapping region of an orthographic projections of the first touch layer and the second touch layer on the first substrate.

In some embodiments, the first pressure sensitive member is made of a different material from the second pressure sensitive member.

In some embodiments, the touch panel further includes an insulating layer. The insulating layer is arranged between the first touch layer and the second touch layer; the insulating layer is configured to separate the first touch layer from the second touch layer; and the spacer penetrates through the insulating layer.

In some embodiments, the spacer includes a first portion and a second portion, where the first portion is located between the insulating layer and the first substrate, and the second portion is located between the insulating layer and the second substrate.

In some embodiments, the first portion and the second portion have a same shape.

In some embodiments, the first portion has a different shape from the second portion.

In some embodiments, the touch panel further includes a light blocking layer. The light blocking layer is arranged between the second touch layer and the second substrate.

In some embodiments, the spacer has a square shape.

In some embodiments, orthographic projections of a first surface of the spacer close to the first substrate and a second surface of the spacer close to the second substrate on the first substrate cover an orthographic projection of a middle part of the spacer on the first substrate.

In some embodiments, the spacer is made of an electric insulating and retractable material.

Some embodiments further provide a touch display device including the above touch panel.

A method for manufacturing a touch panel includes forming a plurality of pressure sensing structures and a touch layer at one side of a first substrate and arranging a second substrate at one side of the touch layer away from the first substrate. The plurality of pressure sensing structures and the touch layer are arranged in a same layer, and each of the plurality of pressure sensing structures includes a first pressure sensitive member and a second pressure sensitive member. A pressure sensitivity of the first pressure sensitive member is different from a pressure sensitivity of the second pressure sensitive member.

In some embodiments, the method for manufacturing the touch panel further includes, before the forming a plurality of pressure sensing structures and a touch layer at one side of the first substrate, arranging a spacer at one side of the first substrate, where the spacer is configured to separate the first pressure sensitive member from the second pressure sensitive member of the each of the plurality of pressure sensing structure.

In some embodiments, the forming a plurality of pressure sensing structures and a touch layer at one side of the first substrate includes forming a first pressure sensitive member on a first side of the spacer, forming a second pressure sensitive member on a second side of the spacer, and forming the touch layer at one side of the first substrate. The each of the plurality of pressure sensing structures includes the first pressure sensitive member and the second pressure sensitive member, and the touch layer and the plurality of pressure sensing structures are arranged in a same layer.

In some embodiments, the forming a plurality of pressure sensing structures and a touch layer at one side of the first substrate includes forming the touch layer at one side of the first substrate, forming a first pressure sensitive member between the touch layer and a first side of the spacer opposite to the touch layer, and forming a second pressure sensitive member between a second side of the spacer and the touch layer, where the second side surface is arranged opposite to the first side surface, and the each of the plurality of pressure sensing structures includes the first pressure sensitive member and the second pressure sensitive member.

In some embodiments, the forming a plurality of pressure sensing structures and a touch layer at one side of the first substrate includes:

arranging a first portion of the spacer at one side of the first substrate;

forming a first touch layer at one side of the first substrate, where the first touch layer and the first portion of the spacer are arranged in a same layer;

forming a first sub-portion of the first pressure sensitive member between a first side of the first portion and the first touch layer;

forming a first sub-portion of the second pressure sensitive member between a second side of the first portion and the first touch layer;

forming an insulating layer at one side of the first touch layer away from the first substrate;

arranging a second portion of the spacer on a surface of the insulating layer away from the first substrate;

forming a second sub-portion of the first pressure sensitive member at a first side of the second portion of the spacer;

forming a second sub-portion of the second pressure sensitive member at a second side of the second portion of the spacer, where a projection of the first sub-portion of the first pressure sensitive member overlaps with a projection of the second sub-portion of the first pressure sensitive member, and a projection of the first sub-portion of the second pressure sensitive member overlaps with a projection of the second sub-portion of the second pressure sensitive member;

assembling the first portion and the second portion; and forming a second touch layer on the insulating layer;

where the second touch layer and the second portion of the spacer are arranged in a same layer, the spacer includes the first portion and the second portion, and the touch layer includes the first touch layer and the second touch layer

BRIEF DESCRIPTION OF THE DRAWINGS

Drawings of this disclosure, which constitute a part of this specification, provide understanding of the technical solutions of the following embodiments and, together with the embodiments of the present application, serve to explain the technical solution of the embodiments of the present invention.

DETAILED DESCRIPTION

Hereinafter, the embodiments of the present disclosure will be described in detail in combination with drawings.

Unless otherwise defined, any technical or scientific term used in the following embodiments shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection.

Figure 1:
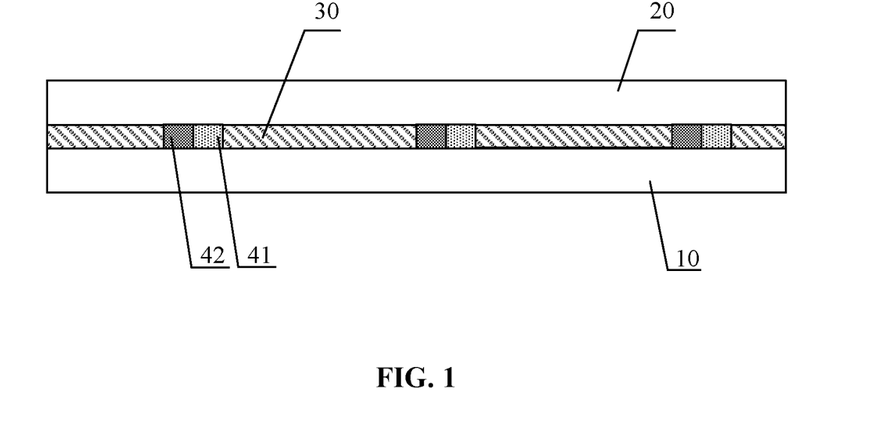
FIG. 1 is a structural schematic diagram of a touch panel according to some embodiments.

FIG. 1 is a structural schematic diagram of a touch panel according to some embodiments. As shown in FIG. 1, the touch panel includes a first substrate 10, a second substrate 20 arranged opposite to the first substrate 10, a touch layer 30 and a plurality of pressure sensing structures.

The touch layer 30 is located between the first substrate 10 and the second substrate 20. The plurality of pressure sensing structures and the touch layer 30 are arranged in a same layer. Each pressure sensing structure includes a first pressure sensitive member 41 and a second pressure sensitive member 42, where a pressure sensitivity of the first pressure sensitive member 41 is different from a pressure sensitivity of the second pressure sensitive member 42.

In the above embodiments, the touch layer 30 is configured to transmit a signal generated by the pressure sensing structure when the pressure sensing structure is pressed. In some embodiments, the structure of the touch layer 30 is determined by the type of the touch panel. In some embodiments, the touch panel is a self-capacitance touch panel, and the touch layer 30 consists of one layer. In some embodiments, the touch panel is a mutual-capacitance touch panel, and the touch layer 30 consists of two layers. In FIG. 1, the self-capacitance touch panel is taken as an example.

In some embodiments, the first pressure sensitive member 41 and the second pressure sensitive member 42 have different linearities. The linearity refers to a maximal linear derivation between an output current intensity and a pressure within a range of a working pressure. That is, the first pressure sensitive member 41 and the second pressure sensitive member 42 have different pressure sensitivities.

In some embodiments, the plurality of pressure sensing structures is arranged in an array. In some embodiments, the higher the touch accuracy, the larger the number of the pressure sensing structures.

In some embodiments, in order not to influence the display panel displaying pictures, the first substrate 10 and the second substrate 20 are both transparent substrates. As for the transparent substrate, for example, a glass substrate, a plastic substrate or a quartz substrate may be used.

Figure 5:
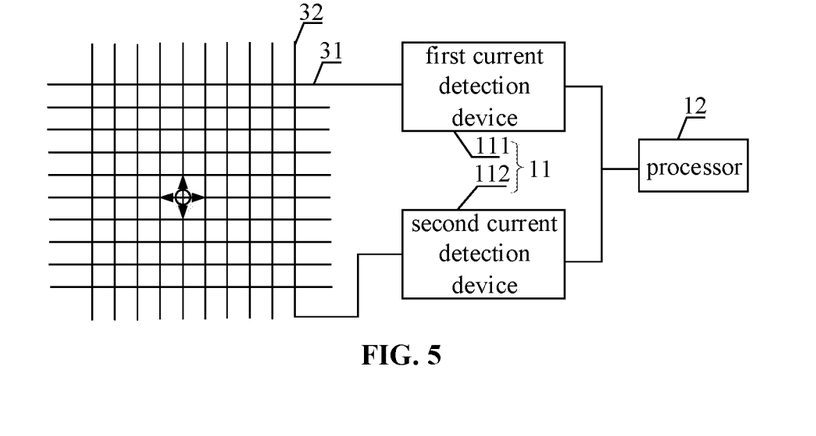
FIG. 5 is a structural schematic diagram of touch display according to some embodiments.

In some embodiments, as shown in FIG. 5, the touch panel further includes a controller 11 and a processor 12. The controller 11 receives a signal transmitted by the pressure sensing structure through the touch layer 30, and transmits the received signal to the processor 12. The processor 12 analyzes the received signal, and transmits an analysis result to the controller 12 which executes corresponding commands.

In some embodiments, in the case that the pressure sensing structure is touched by fingers, when a sudden pressure is applied from outside or there is a change in pressure, the pressure sensing structure is deformed. Due to their different pressure sensitivities, the deformation of the first pressure sensitive member and the deformation of the second pressure sensitive member are different, leading to different voltages of the signals generated by two ends of deformed part. In some embodiments, according to the position where the signal is generated, an instruction corresponding to the touch position in a two-dimensional X/Y plane is monitored, and, according to different signals generated by the two pressure sensitive members, the instruction corresponding to position out of the touch position is monitored.

For example, when a user is drawing on the touch panel, if a voltage of the signal generated by the deformation of the first pressure sensitive member 41 is greater than a voltage of the signal generated by the deformation of the second pressure sensitive member, a line displaying in a touch region corresponding to the first pressure sensitive member 41 is thicker than a line displaying in a touch region corresponding to the second pressure sensitive member 42.

In some embodiments, according to different signals generated by the two pressure sensitive members, a human emotion is analyzed.

In the above-mentioned embodiments, with a difference between the deformations of the first pressure sensitive member 41 and the second pressure sensitive member 42, other instructions out of a user touch position are monitored, and thereby the application range of the touch screen is extended.

The touch panel according to the above-mentioned embodiment includes the first substrate, the second substrate arranged opposite to the first substrate, the touch layer and the plurality of pressure sensing structures, where the touch layer is located between the first substrate and the second substrate; the plurality of pressure sensing structures and the touch layer are arranged in the same layer; each pressure sensing structure includes the first pressure sensitive member and the second pressure sensitive member; and the pressure sensitivity of the first pressure sensitive member is different from that of the second pressure sensitive member.

In the above-mentioned embodiments, the pressure sensing structure including two pressure sensitive members is arranged in the touch panel. Due to different pressure sensitivities of the two pressure sensitive members, in the situation that the pressure sensing structure is touched by fingers, the deformations of the two pressure sensitive members are different. With different signals transmitted by the touch layer, which may monitor other instructions out of the user touch position, the application range of the touch screen is extended.

In some embodiments, a material of the first pressure sensitive member 41 is different from a material of the second pressure sensitive member 42. In some embodiments, the first pressure sensitive member 41 and the second sensitive member 42 are made of a nanometer material.

Figure 2A:
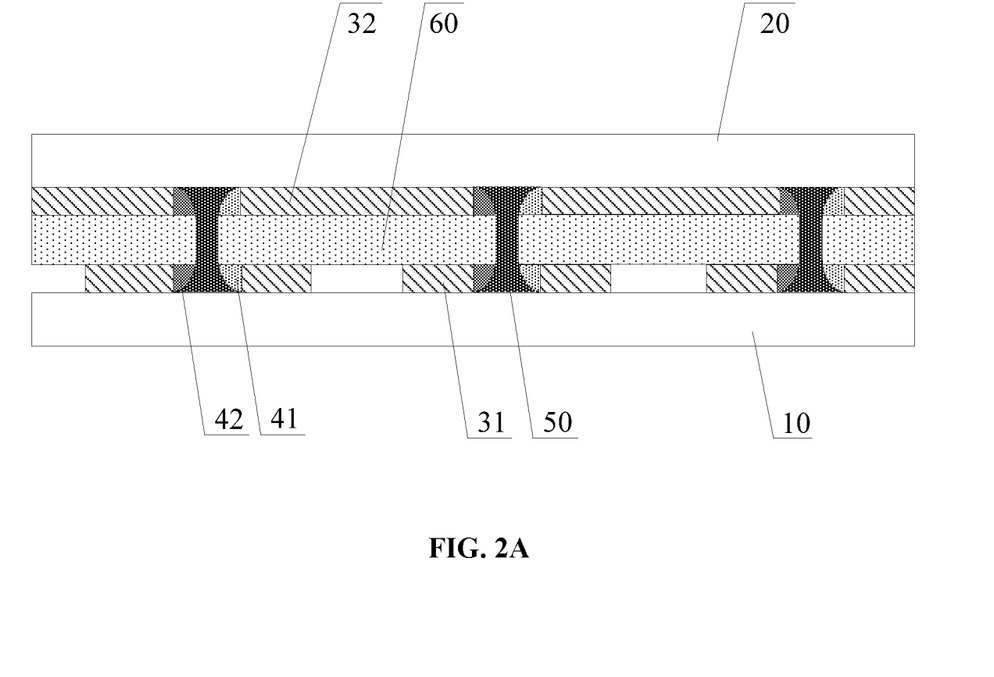
FIG. 2A is a structural schematic diagram of a touch panel according to some other embodiments.
Figure 2B:
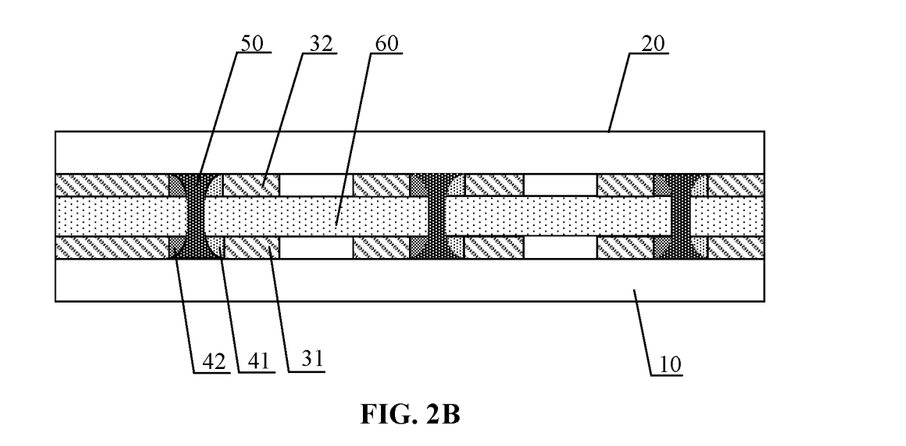
FIG. 2B is a schematic diagram for a profile structure of the touch panel in FIG. 2A which is cut along its diagonal.
Figure 3:
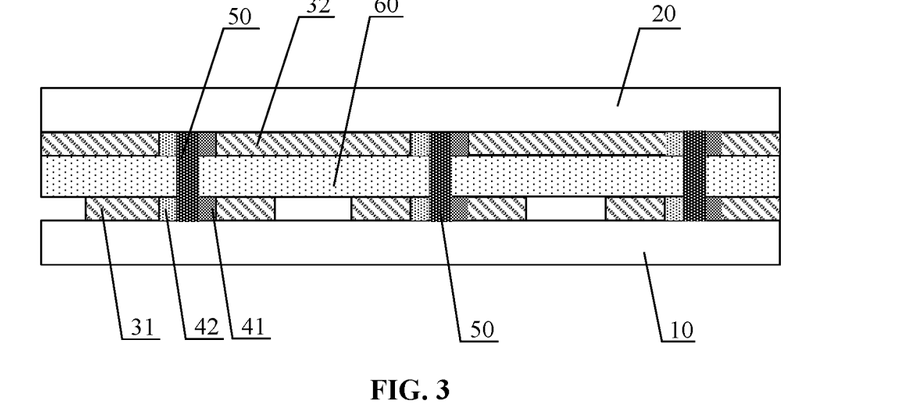
FIG. 3 is a structural schematic diagram of the touch panel according to some other embodiments.

FIG. 2A is a structural schematic diagram of a touch panel according to some embodiments, FIG. 2B is a schematic diagram for a profile structure of the touch panel in FIG. 2A which is cut along its diagonal, and FIG. 3 is a structural schematic diagram of the touch panel according to some other embodiments. In some embodiments, as shown in FIGS. 2A, 2B and 3, the touch panel further includes a spacer 50. The spacer 50 is arranged to separate the first pressure sensitive member 41 from the second pressure sensitive member 42 in each of the plurality of pressure sensing structures.

In the condition that the first pressure sensitive member 41 and the second pressure sensitive member 42 are in contact for a lone time, molecule of the first pressure sensitive member 41 penetrates to the second pressure sensitive member 42 and molecule of the second pressure sensitive member 42 penetrates to the first pressure sensitive member 41. The spacer 50 arranged between the first pressure sensitive member 41 and the second pressure sensitive member 42 may avoid molecule of the first pressure sensitive member 41 penetrating to the second pressure sensitive member 42 and molecule of the second pressure sensitive member 42 penetrating to the first pressure sensitive member 41. The mutual molecular penetration of the first pressure sensitive member 41 and the second pressure sensitive member 42 may not enrich touch technology applications.

In some embodiments, the spacer 50 penetrates through the touch layer 30. The first pressure sensitive member 41 of each pressure sensing structure is located between a first side of the spacer 50 and the touch layer 30, and the second pressure sensitive member 42 is located between a second side of the spacer 50 and the touch layer 30.

The first side of the spacer 50 is an area of a side of the spacer 50, and the second side surface is another area of the side of the spacer. In some embodiments, the area arranging the first side of the spacer 50 and another area arranging the second side of the spacer 50 are symmetric about the spacer.

In FIGS. 2A, 2B and 3, the touch layer 30 consisting of two layers is taken as an example. In some embodiments, the touch layer 30 includes a first touch layer 31 and a second touch layer 32. The first touch layer 31 is located at one side of the first substrate 10 close to the second substrate 20, and the second touch layer 32 is located at one side of the second substrate 20 close to the first substrate 10.

In some embodiments, in order to avoid mutual influence of signals generated by the first touch layer 31 and the second touch layer 32, the first touch layer 31 and the second touch layer 32 are separated, and do not contact directly.

In some embodiments, the first touch layer 31 includes a plurality of first touch electrodes, the second touch layer 32 includes a plurality of second touch electrodes, and projections of the plurality of first touch electrodes and the plurality of second touch electrodes on the first substrate 10 are crossed.

In some embodiments, an electric insulating material is filled between the two adjacent first touch electrodes, and an electric insulating material is filled between the two adjacent second touch electrodes. In some embodiments, the positions, line widths and the number of the first touch electrodes are in accordance with those of data lines of display panel, and the positions, line widths and the number of the second touch electrodes are in accordance with those of signal lines of display panel, such that the structure of the touch panel does not change an aperture ratio of the display panel.

In some embodiments, in order to ensure that the user touches a same position by fingers when the first touch layer and the second touch layer are pressed at the same time, the orthographic projection of the pressure sensing structure on the first substrate 10 is located in an overlapping region of the orthographic projections of the first touch layer 31 and the second touch layer 32 on the first substrate 10.

In some embodiments, the first pressure sensitive member 41 and the second pressure sensitive member 42 are symmetrically arranged at two sides of the spacer 50.

In some embodiments, the orthographic projections of the first surface of the spacer 50 close to the first substrate 10 and the second surface of the spacer 50 close to the second substrate 20 on the first substrate 10 both cover the orthographic projection of a middle part of the spacer 50 on the first substrate 10. In some embodiments, as shown in FIGS. 2A and 2B, the spacer 50 is of a "dumbbell" shape which is thick at both ends and thin in the middle, which may improve the sensitivity of the touch panel receiving instructions. The first pressure sensitive member 41 and the second pressure sensitive member 42 are located at two sides of the middle part of the "dumbbell" structure. When the spacer 50 is deformed due to an external force, the first pressure sensitive member 41 and the second pressure sensitive member 42 are deformed at the same time, and the signals generated by two ends of the deformed part are transmitted to the controller 11.

In some embodiments, as shown in FIG. 3, the spacer 50 has a rectangular cross section along a plane perpendicular to the first substrate 10. The orthographic projections of a first surface of the spacer 50 close to the first substrate 10 and a second surface of the spacer 50 close to the second substrate 20 on the first substrate 10 both cover the orthographic projection of a middle part of the spacer 50 on the first substrate 10.

In some embodiments, the spacer 50 is made of an electric insulating and elastic material.

The spacer made of an electric insulating material may avoid the mutual interference between a signal generated by the first touch layer and a signal generated by the second touch layer. The spacer made of an elastic material may ensure that the spacer restores to its original shape after it is pressed by the user, and avoid an irreversible damage due to the user pressing the pressure sensing structure.

In some embodiments, the spacer 50 is integrated. In some embodiments, the spacer 50 consists of two parts. In some embodiments, as shown in FIG. 3, the integrated spacer 50 is a rectangular column. In some embodiments, as shown in FIGS. 4A, 4B and 4C, the spacer has a dumbbell shape, and consists of two parts.

Figure 4A:
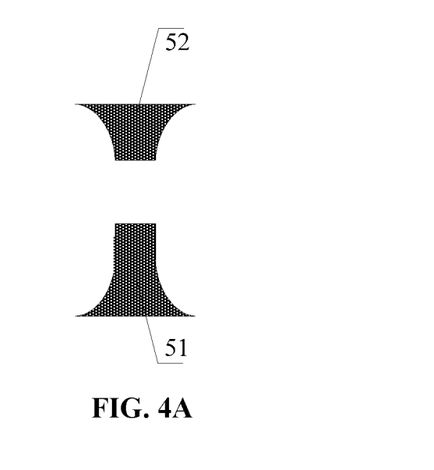
FIG. 4A is a structural schematic diagram of a spacer according to some embodiments.
Figure 4B:
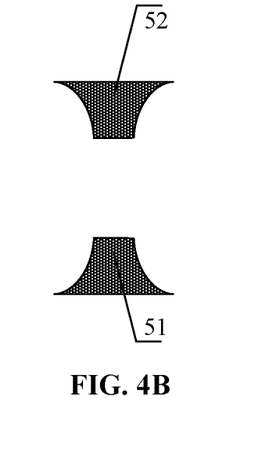
FIG. 4B is a structural schematic diagram of a spacer according to some other embodiments.
Figure 4C:
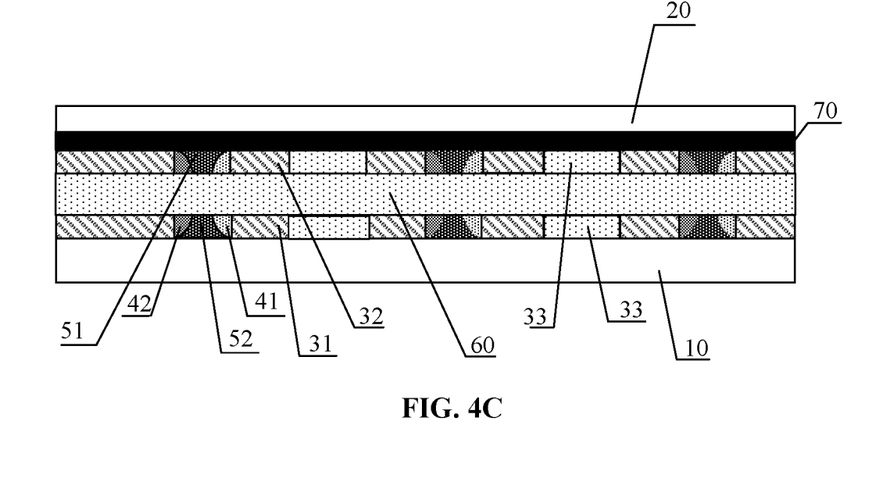
FIG. 4C is a structural schematic diagram of a touch display according to some other embodiments.

FIGS. 4A and 4B are structural schematic diagrams of a spacer according to some embodiments. In some embodiments, as shown in FIGS. 4A and 4B, the spacer 50 includes a first portion 51 and a second portion 52. In some embodiments, as shown in FIG. 4A, the first portion 51 has different shape and/or size from the second portion 52. In some embodiments, as shown in FIG. 4B, the first portion 51 have the same size and shape as the second portion 52.

In some embodiments, as shown in FIGS. 2A, 2B and 3, the touch panel further includes an insulating layer 60. The insulating layer 60 is arranged between the first touch layer 31 and the second touch layer 32, for separating the first touch layer 31 from the second touch layer 32.

In some embodiments, as shown in FIGS. 2A, 2B and 3, the spacer 50 is integrated, penetrating through the insulating layer 60.

In some embodiments, with reference to FIG. 4C, the spacer 50 includes a first portion 51 and a second portion 52, and the insulating layer 60 is located between the first portion 51 and the second portion 52.

In some embodiments, the insulating layer 60 is made of at least one of silicon oxide or silicon nitride.

FIG. 5 is a schematic diagram of touch display according to some embodiments. In some embodiments, as shown in FIG. 5, the touch panel further includes a controller 11 and a processor 12. The controller 11 includes a first current detection device 111 and a second current detection device 112. As shown in FIG. 5, when the user touches a circle in the drawing, the first pressure sensitive member 41 and the second pressure sensitive member 42 are respectively pressed to generate current, the first current detection device 111 connected with the first touch layer 31 detects the current and sends the current value to the processor, the second current detection device 112 connected with the second touch layer 32 detects the current and sends the current value to the processor 12, and the current values of the two current detection devices are acquired and analyzed by the processor 12, so as to determine the coordinates of the touch position and other instructions out of the user touch position.

In some embodiments, the processor may be a central processing unit (CPU).

Figure 6:
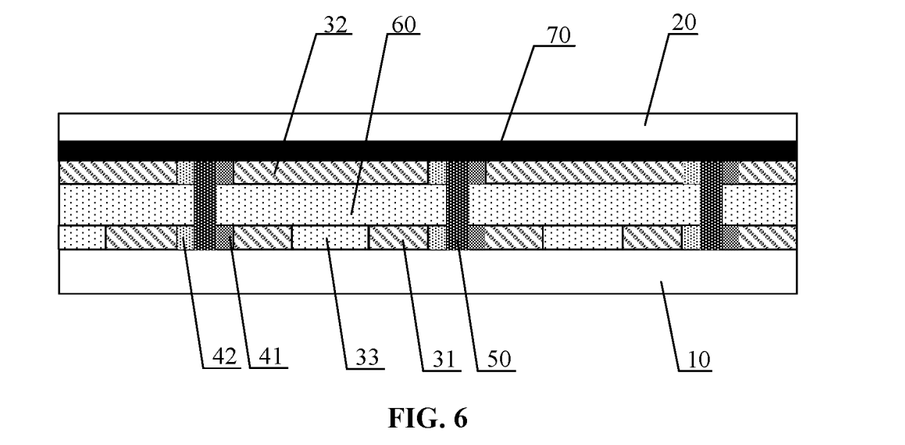
FIG. 6 is a structural schematic diagram of the touch panel according to some other embodiments.

FIG. 6 is a structural schematic diagram of the touch panel according to some embodiments. In some embodiments, as shown in FIG. 6, the touch panel further includes a light blocking layer 70, where the light blocking layer 70 is arranged between the second touch layer 32 and the second substrate 20. In FIG. 6, a square spacer is taken as an example.

In some embodiments, the light blocking layer 70 is made of chromium, a compound of chromium and chromic oxide, or a mixture of resin and carbon. In some embodiments, as shown in FIG. 6, an insulating material 33 is filled between the two adjacent first touch electrodes, and an insulating material is filled between the two adjacent second touch electrodes.

Figure 7:
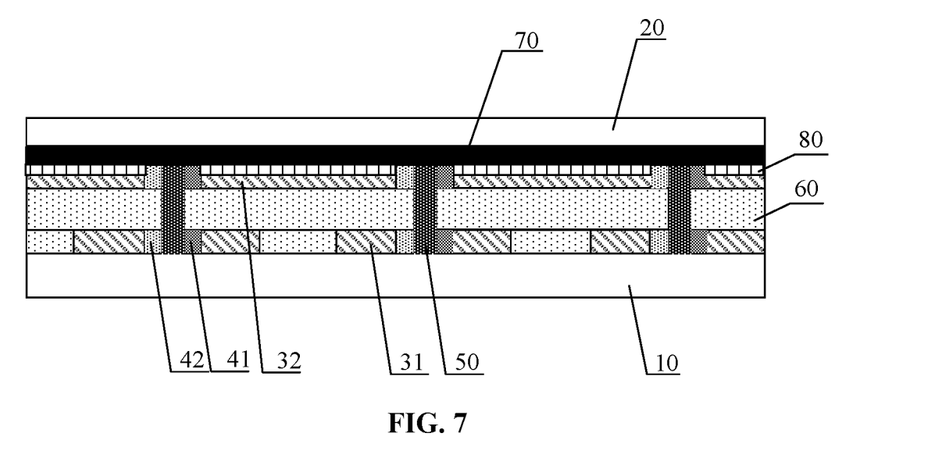
FIG. 7 is a structural schematic diagram of the touch panel according to some other embodiments.

In some embodiments, as shown in FIG. 7, the touch panel further includes a protective layer 80, where the protective layer 80 is arranged between the second touch layer 32 and the light blocking layer 70. The protective layer 80 avoids the corroding the second touch layer 32 by an etching liquid adopted when the light blocking layer 70 is formed.

In some embodiments, the protective layer is made of at least one of silicon oxide or silicon nitride.

Figure 8A:
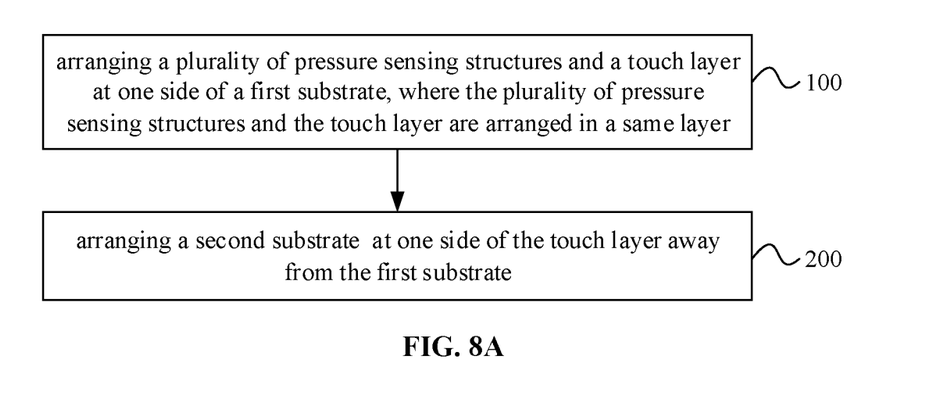
FIG. 8A is a flow chart of a method for manufacturing the touch panel according to some embodiments.

The following embodiment provides a method for manufacturing a touch panel. FIG. 8A is a flow chart of a method for manufacturing the touch panel according to some embodiments. In some embodiments, as shown in FIG. 8A, the method for manufacturing the touch panel includes the step 100 and the step 200.

In the step 100, a plurality of pressure sensing structures and a touch layer at one side of the first substrate, where the plurality of pressure sensing structures and the touch layer arranged in a same layer are formed.

Each of the plurality of pressure sensing structure includes a first pressure sensitive member and a second pressure sensitive member.

In some embodiments, the first substrate is a transparent substrate. In some embodiments, the first substrate is a glass substrate, a quartz substrate or a plastic substrate.

In some embodiments, a pressure sensitivity of the first pressure sensitive member is different from a pressure sensitivity of the second pressure sensitive member.

In some embodiments, a material of the first pressure sensitive member is different from a material of the second pressure sensitive member. In some embodiments, the first pressure sensitive member and the second pressure sensitive member are made of a nanometer material.

In the step 200, a second substrate is arranged at one side of the touch layer away from the first substrate.

In some embodiments, the second substrate is a transparent substrate. In some embodiments, the second substrate is a glass substrate, a quartz substrate or a plastic substrate.

In the above-mentioned method embodiment, the pressure sensing structure including two pressure sensitive members is arranged in the touch panel. Due to different pressure sensitivities of the two pressure sensitive members, when the pressure sensing structure is touched by fingers, the deformations of the two pressure sensitive members are different, with different signals transmitted by the touch layer, which may monitor other instructions out of the user touch position, and extend the application range of the touch screen.

In some embodiments, based on the above method embodiments, the method for manufacturing the touch panel further includes: before step 100, arranging a spacer at a side of the first substrate, where the plurality of pressure sensing structures are arranged on the side of the first substrate, and the spacer separates the first pressure sensitive member from the second pressure sensitive member of each pressure sensing structure.

In some embodiments, the spacer is made of an electric insulating and elastic material, and is formed by injection molding.

In some embodiments, the step 100 includes: forming a spacer at one side of the first substrate; forming a first pressure sensitive member on a first side of the spacer; forming a second pressure sensitive member on a second side of the spacer; and forming a touch layer at the one side of the first substrate, where the touch layer and the plurality of pressure sensing structures are arranged in a same layer.

In some embodiments, the step 100 includes: forming a touch layer at one side of the first substrate; forming a spacer between adjacent touch layers; forming a first pressure sensitive member between a first side of the spacer and the touch layer; and forming a second pressure sensitive member between a second side of the spacer and the touch layer.

In some embodiments, as shown in FIGS. 4A, 4B and 4C, the spacer includes a first portion and a second portion. The step 100 includes arranging a first portion of the spacer at one side of the first substrate; forming a touch layer at the one side of the first substrate; forming a first pressure sensitive member between the touch layer and the first side of the first portion of the spacer; and forming the second pressure sensitive member between the touch layer and the second side of the first portion of the spacer.

In some embodiments, the method for manufacturing the touch panel further includes, after the step 100, depositing an insulating film at one side of the touch layer away from the first substrate; forming a protective layer by a patterning process; depositing a light blocking material at one side of the protective layer away from the first substrate; and forming the light blocking layer through the patterning process.

In some embodiments, the insulating film is made of at least one of silicon oxide and silicon nitride.

Figure 8B:
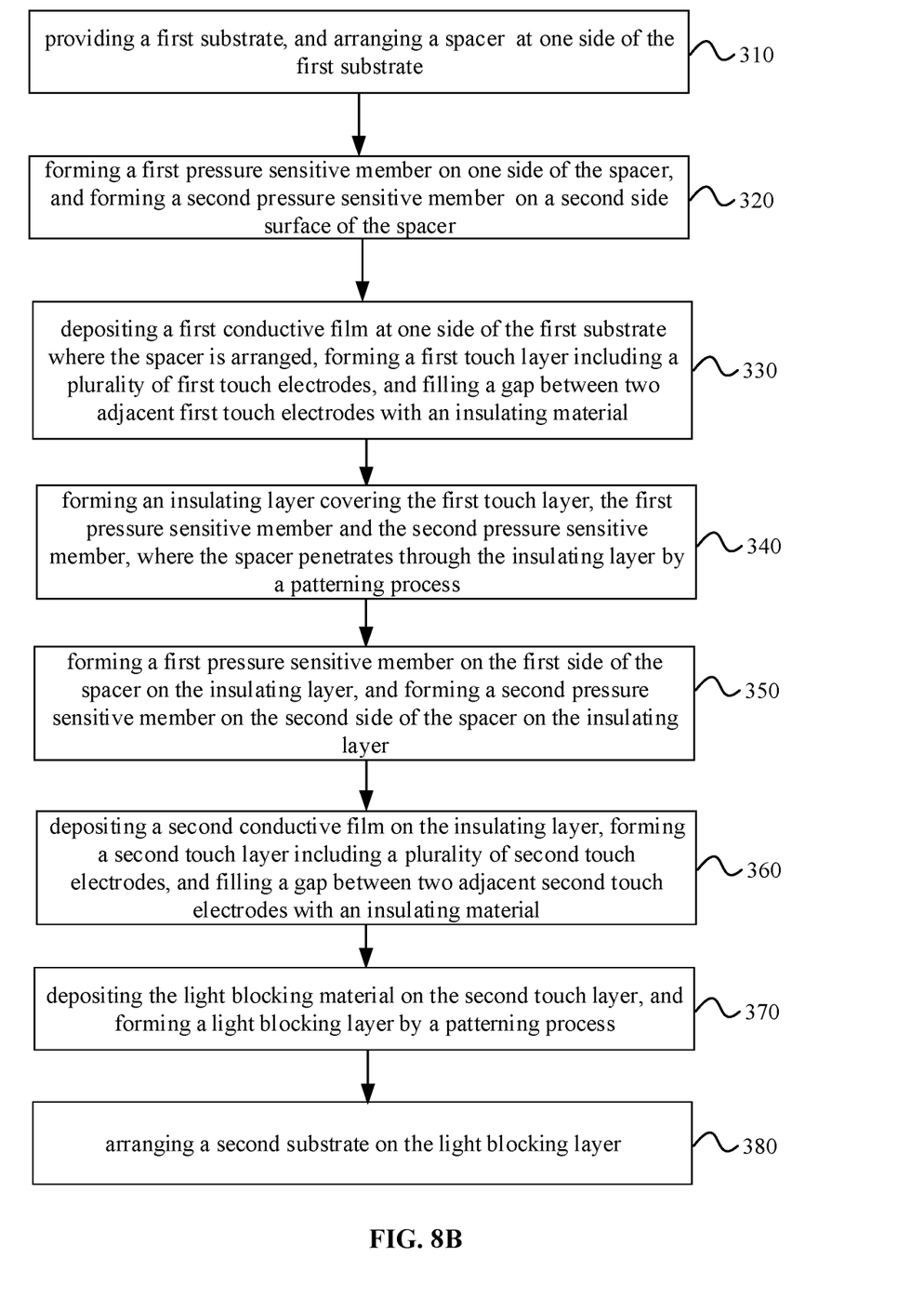
FIG. 8B is a flow chart of a method for manufacturing the touch panel according to some other embodiments.

In the following embodiments, the spacer is square. After the pressure sensing structure is formed on the first substrate, the touch layer is formed, and includes the first touch layer and the second touch layer, as an example. In combination with FIGS. 9A-9G and 6, the method for manufacturing the touch panel is described. FIG. 8B is a flow chart of a method for manufacturing the touch panel according to some embodiments. As shown in FIG. 8B, the method for manufacturing the touch panel includes the step 310 to the step 380. The patterning process includes photoresist coating, exposing, developing, etching and photoresist stripping.

Figure 9A:
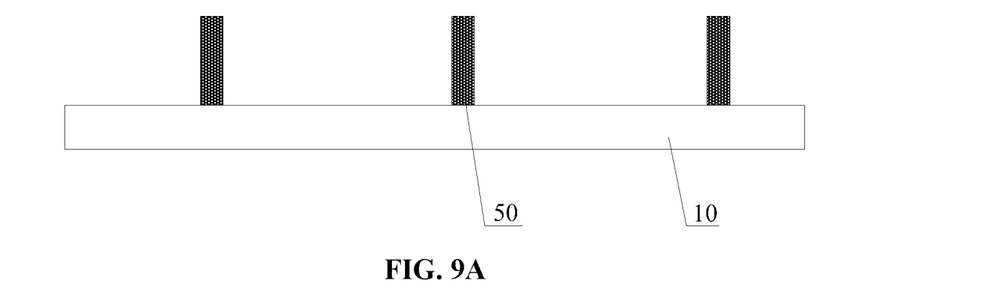
FIG. 9A is a structural schematic diagram of the touch panel which is manufactured according to step 310 in the method for manufacturing the touch panel in FIG. 8B.

In the step 310, the first substrate 10 is provided, and a spacer 50 is arranged at one side of the first substrate 10, as shown in FIG. 9A.

In some embodiments, the first substrate is a glass substrate, a plastic substrate or a quartz substrate.

In some embodiments, the spacer is made of an electric insulating and elastic material, and is formed by injection molding. A plurality of spacers 50 is arranged in an array, and the orthographic projection of spacer 50 on the first substrate is located in an overlapping region of the orthographic projections of the first touch layer and the second touch layer on the first substrate.

Figure 9B:
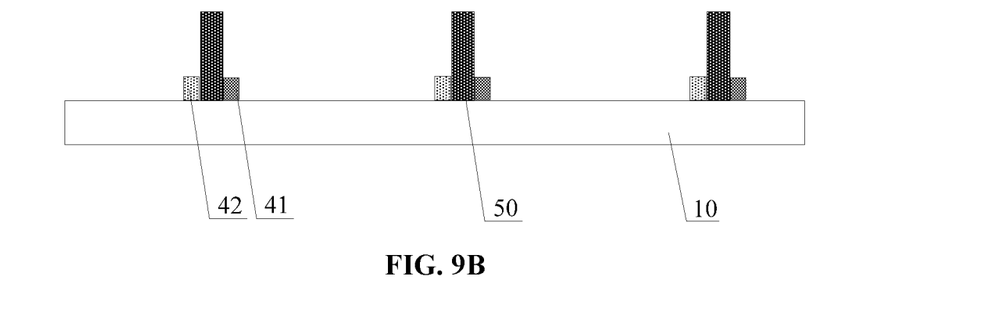
FIG. 9B is a structural schematic diagram of the touch panel which is manufactured according to step 320 in the method for manufacturing the touch panel in FIG. 8B.

In the step 320, the first pressure sensitive member 41 is formed on one side of the spacer 50, and the second pressure sensitive member 42 is formed on the second side surface of the spacer 50, as shown in FIG. 9B.

Figure 9C:
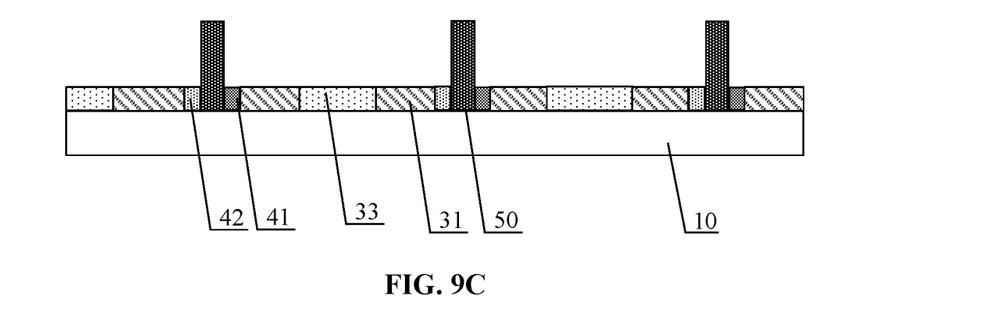
FIG. 9C is a structural schematic diagram of the touch panel which is manufactured according to step 330 in the method for manufacturing the touch panel in FIG. 8B.

In the step 330, a first conductive film is deposited at one side of the first substrate 10 where the spacer 50 is arranged. With the patterning process, a first touch layer 31 including a plurality of first touch electrodes is formed, and a gap between two adjacent first touch electrodes of the plurality of first touch electrodes is filled with an insulating material 33, as shown in FIG. 9C.

In some embodiments, the spacer 50 penetrates through the first touch layer 31, and the first conductive film is deposited by a magnetron sputtering process or a plasma enhanced chemical vapor deposition (PECVD) process.

In some embodiments, the first conductive film is made of metal or ITO (indium tin oxide).

Figure 9D:
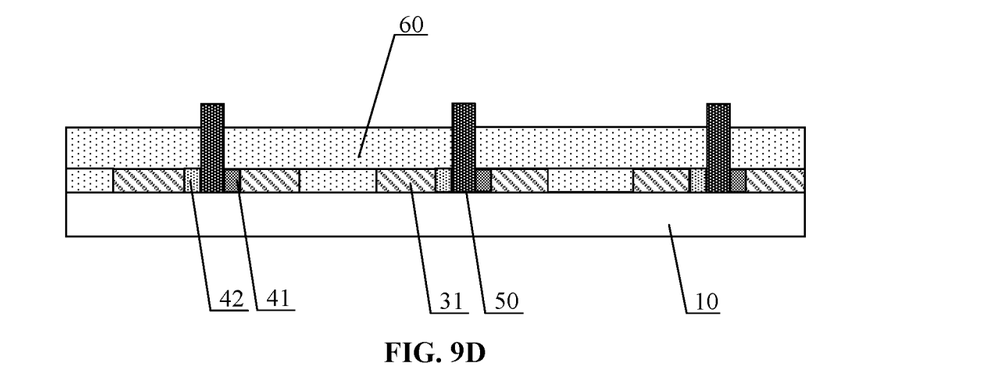
FIG. 9D is a structural schematic diagram of the touch panel which is manufactured according to step 340 in the method for manufacturing the touch panel in FIG. 8B.

In the step 340, an insulating layer 60 covering the first touch layer 31, the first pressure sensitive member 41 and the second pressure sensitive member 42, is formed, and the spacer 50 penetrates through the insulating layer 60 by the patterning process, as shown in FIG. 9D.

In some embodiments, the insulating film is deposited by the magnetron sputtering process or the plasma enhanced chemical vapor deposition (PECVD) process.

In some embodiments, the insulating film is made of at least one of silicon oxide and silicon nitride.

Figure 9E:
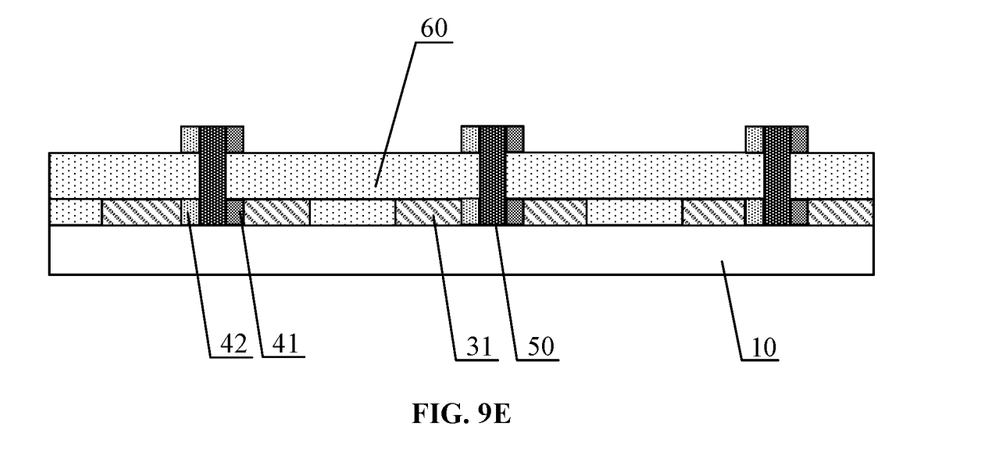
FIG. 9E is a structural schematic diagram of the touch panel which is manufactured according to step 350 in the method for manufacturing the touch panel in FIG. 8B.

In the step 350, the first pressure sensitive member 41 is formed on the first side of the spacer 50 on the insulating layer 60, and the second pressure sensitive member 42 is formed on the second side of the spacer 50 on the insulating layer 60, as shown in FIG. 9E.

Figure 9F:
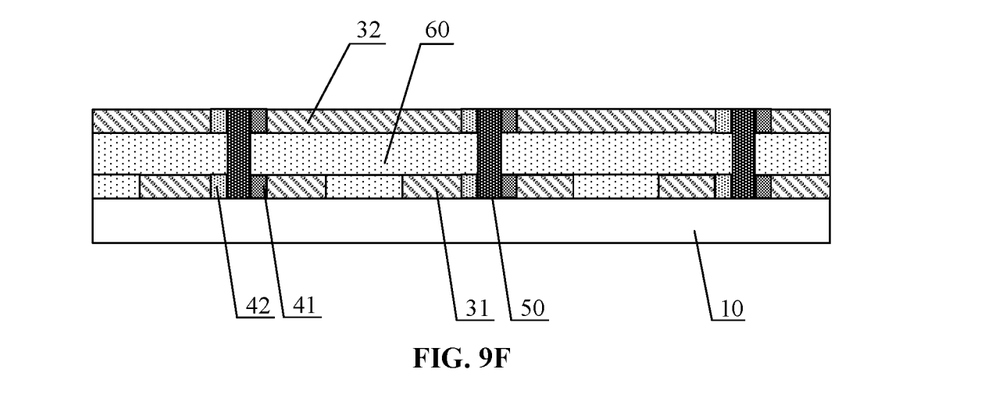
FIG. 9F is a structural schematic diagram of the touch panel which is manufactured according to step 360 in the method for manufacturing the touch panel in FIG. 8B.

In the step 360, a second conductive film is deposited on the insulating layer 60. With the patterning process, a second touch layer 32 including a plurality of second touch electrodes is formed, and a gap between two adjacent second touch electrodes is filled with the insulating material, as shown in FIG. 9F.

In some embodiments, the spacer 50 penetrates through the second touch layer 32, and the second conductive film is deposited by a magnetron sputtering process or a plasma enhanced chemical vapor deposition (PECVD) process.

In some embodiments, the second conductive film is made of metal or ITO (indium tin oxide).

Figure 9G:
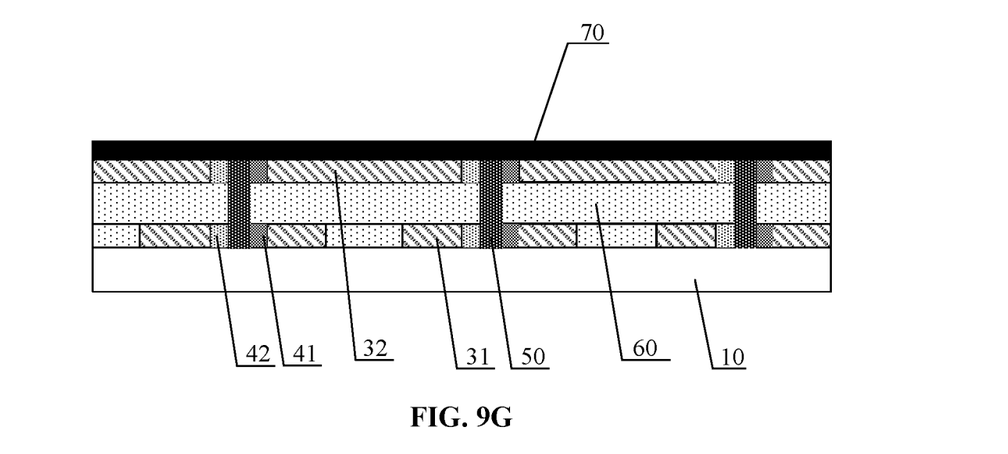
FIG. 9G is a structural schematic diagram of the touch panel which is manufactured according to step 370 in the method for manufacturing the touch panel in FIG. 8B.

In the step 370, the light blocking material is deposited on the second touch layer 32, and the light blocking layer 70 is formed by the patterning process, as shown in FIG. 9G.

In some embodiments, the light blocking material is made of chromium, compound of chromium and chromic oxide, or mixture of resin and carbon. The light blocking material is deposited by a magnetron sputtering process or a plasma enhanced chemical vapor deposition (PECVD) process.

In some embodiments, the light blocking material is deposited by the sputtering process.

In the step 380, the second substrate 20 is arranged on the light blocking layer 70, as shown in FIG. 6.

In some embodiments, the second substrate 20 is a transparent substrate. In some embodiments, the second substrate is a glass substrate, a plastic substrate or a quartz substrate.

In some embodiments, the spacer 50 has a "dumbbell" shape, and the insulating layer separates the spacer 50 into a first portion 51 and a second portion 52. The method for manufacturing the touch panel includes the following steps. The touch panel formed according to the steps is as shown in FIG. 4C.

The first portions 51 of a plurality of spacers 50 are arranged at one side of the first substrate 10.

The first touch layer 31 is formed at one side of the first substrate 10, and the insulating material 33 is filled between two adjacent first touch electrodes 31. The first touch layer 31 and the first portion of the spacer are arranged in a same layer.

A first sub-portion of the first pressure sensitive member 41 is formed between the first touch layer 31 and a first side of the first portions 51 of the plurality of spacers, and a first sub-portion of the second pressure sensitive member 42 is formed between the first touch layer 31 and a second side surface of the first portions 51.

The insulating layer 60 is formed at one side of the first touch layer 31 away from the first substrate 10. A second portion of the spacer is arranged on a surface of the insulating layer away from the first substrate.

A second sub-portion of the first pressure sensitive member 41 is formed at a first side of the first portions 52 of the plurality of spacers 50, and a second sub-portion of the second pressure sensitive member 42 is formed at a second side of the first portions 52. A projection of the first sub-portion of the first pressure sensitive member overlaps with a projection of the second sub-portion of the first pressure sensitive member, and a projection of the first sub-portion of the second pressure sensitive member overlaps with a projection of the second sub-portion of the second pressure sensitive member.

The second portions 52 of the plurality of spacers 50 and the first portions 51 of the plurality of spacers 50 are assembled together.

The second touch layer 32 and the light blocking layer 70 are formed successively on the insulating layer 60, and the second substrate 20 is formed on the light blocking layer 70.

In some embodiments, the second touch layer 32 includes a plurality of second touch electrodes, and the insulating material 33 is filled between the two adjacent second touch electrodes.

Some embodiments provide a touch display device which includes a touch panel according to any one of the above embodiments.

In some embodiments, the touch display device is a product or component with a touch function. For example, the touch display device is at least one of a mobile phone, tablet personal computer (PC), a television, a display, a notebook computer, a digital photo frame and a navigator or its component.

What is claimed is:

1. A touch panel, comprising:
a first substrate;
a second substrate arranged opposite to the first substrate;
a touch layer; and
a plurality of pressure sensing structures;
wherein the touch layer is located between the first substrate and the second substrate; the plurality of pressure sensing structures and the touch layer are arranged in a same layer; each of the plurality of pressure sensing structures comprises a first pressure sensitive member and a second pressure sensitive member; and a pressure sensitivity of the first pressure sensitive member is different from a pressure sensitivity of the second pressure sensitive member.

2. The touch panel according to claim 1, further comprising a spacer,
wherein the spacer is configured to separate the first pressure sensitive member of the each of the plurality of pressure sensing structures from the second pressure sensitive member of the each of the plurality of pressure sensing structures.

3. The touch panel according to claim 2, wherein the first pressure sensitive member is located between a first side of the spacer and the touch layer; and the second pressure sensitive member is located between a second side of the spacer and the touch layer.

4. The touch panel according to claim 2, wherein the touch layer comprises a first touch layer and a second touch layer; the first touch layer is located at one side of the first substrate close to the second substrate; the second touch layer is located at one side of the second substrate close to the first substrate; and
an orthographic projection of the each of the plurality of pressure sensing structures on the first substrate is located in an overlapping region of an orthographic projections of the first touch layer and the second touch layer on the first substrate.

5. The touch panel according to claim 4, wherein the first pressure sensitive member is made of a different material from the second pressure sensitive member.

6. The touch panel according to claim 4, further comprising an insulating layer;
wherein the insulating layer is arranged between the first touch layer and the second touch layer; the insulating layer is configured to separate the first touch layer from the second touch layer; and the spacer penetrates through the insulating layer.

7. The touch panel according to claim 6, wherein the spacer comprises a first portion and a second portion, wherein the first portion is located between the insulating layer and the first substrate, and the second portion is located between the insulating layer and the second substrate.

8. The touch panel according to claim 7, wherein the first portion and the second portion have a same shape.

9. The touch panel according to claim 7, wherein the first portion has a different shape from the second portion.

10. The touch panel according to claim 4, further comprising a light blocking layer;
wherein the light blocking layer is arranged between the second touch layer and the second substrate.

11. The touch panel according to claim 2, wherein the spacer has a square shape.

12. The touch panel according to claim 2, wherein orthographic projections of a first surface of the spacer close to the first substrate and a second surface of the spacer close to the second substrate on the first substrate cover an orthographic projection of a middle part of the spacer on the first substrate.

13. The touch panel according to claim 2, wherein the spacer is made of an electric insulating and elastic material.

14. A touch display device, comprising the touch panel according to claim 1.

15. A method for manufacturing a touch panel, comprising:
forming a plurality of pressure sensing structures and a touch layer at one side of a first substrate, wherein the plurality of pressure sensing structures and the touch layer are arranged in a same layer, and each of the plurality of pressure sensing structures comprises a first pressure sensitive member and a second pressure sensitive member; and
arranging a second substrate at one side of the touch layer away from the first substrate;
wherein a pressure sensitivity of the first pressure sensitive member is different from a pressure sensitivity of the second pressure sensitive member.

16. The method according to claim 15, further comprising:
before the forming a plurality of pressure sensing structures and a touch layer at one side of the first substrate, arranging a spacer at one side of the first substrate, wherein the spacer is configured to separate the first pressure sensitive member from the second pressure sensitive member of the each of the plurality of pressure sensing structure.

17. The method according to claim 16, wherein the forming a plurality of pressure sensing structures and a touch layer at one side of the first substrate comprises:
forming a first pressure sensitive member on a first side of the spacer;
forming a second pressure sensitive member on a second side of the spacer, wherein the each of the plurality of pressure sensing structures comprises the first pressure sensitive member and the second pressure sensitive member; and
forming the touch layer at one side of the first substrate, wherein the touch layer and the plurality of pressure sensing structures are arranged in a same layer.

18. The method according to claim 16, wherein the forming a plurality of pressure sensing structures and a touch layer at one side of the first substrate comprises:
forming the touch layer at one side of the first substrate;
forming a first pressure sensitive member between the touch layer and a first side of the spacer opposite to the touch layer; and
forming a second pressure sensitive member between a second side of the spacer and the touch layer, wherein the second side surface is arranged opposite to the first side surface, and the each of the plurality of pressure sensing structures comprises the first pressure sensitive member and the second pressure sensitive member.

19. The method according to claim 16, wherein the forming a plurality of pressure sensing structures and a touch layer at one side of the first substrate comprises:
arranging a first portion of the spacer at one side of the first substrate;
forming a first touch layer at one side of the first substrate, wherein the first touch layer and the first portion of the spacer are arranged in a same layer;
forming a first sub-portion of the first pressure sensitive member between a first side of the first portion and the first touch layer;
forming a first sub-portion of the second pressure sensitive member between a second side of the first portion and the first touch layer;
forming an insulating layer at one side of the first touch layer away from the first substrate;
arranging a second portion of the spacer on a surface of the insulating layer away from the first substrate;
forming a second sub-portion of the first pressure sensitive member at a first side of the second portion of the spacer;
forming a second sub-portion of the second pressure sensitive member at a second side of the second portion of the spacer, wherein a projection of the first sub-portion of the first pressure sensitive member overlaps with a projection of the second sub-portion of the first pressure sensitive member, and a projection of the first sub-portion of the second pressure sensitive member overlaps with a projection of the second sub-portion of the second pressure sensitive member;
assembling the first portion and the second portion; and
forming a second touch layer on the insulating layer;
wherein the second touch layer and the second portion of the spacer are arranged in a same layer, the spacer comprises the first portion and the second portion, and the touch layer comprises the first touch layer and the second touch layer.

* * * * *